INVENTORS
WALTER E. LUEFLING
WILLIAM L. KELVER JR.
LESTER E. HILEMAN
BY John J. Gaydos
ATTORNEY ary 17, 1959, respectively, both patents being as-signed to the same assignee as the present invention. Al-though such construction has been widely accepted by the electronic component industry and is used in millions of controls per year, the construction has left much to be desired. For instance, any severe blow or force ap-plied to the outer end of the hollow, steel shaft tends to loosen or weaken the rigid connection between the hollow, steel shaft and the driver. In addition, when assembling the hollow, steel shaft to the driver, care must be exercised to prevent breakage of the driver. Moreover, since the hollow shaft of a tandem control is generally mounted in a horizontal position, most lubri-cants deposited on the thrust bearing have a tendency especially at elevated temperatures to run down the inner bore of the hollow shaft and toward the outer end there-of, the accumulation of the lubricant on the end of the shaft or the knob attached thereto tending to gather dust as well as interfere with the operation of the control. It would, therefore, be desirable to provide an improved driver and hollow shaft assembly overcoming the above-mentioned limitations.

United States Patent Office 3,256,713
Patented June 21, 1966

3,256,713
ROTOR ASSEMBLY FOR AN ELECTRICAL
CONTROL
Walter E. Luefling, Elkhart, Ind., William L. Kelver, Jr., Cassopolis, Mich., and Lester E. Hileman, Elkhart, Ind., assignors to CTS Corporation, Elkhart, Ind., a corporation of Indiana
Filed Feb. 6, 1964, Ser. No. 343,051
10 Claims. (Cl. 64—1)

The present invention relates to electrical controls and, more particularly, to a pair of controls connected in tandem, one control having a hollow shaft and the other control having a shaft rotatable coaxially therewith.

Tandem controls of the type concerned with in the present invention where one shaft is rotatable either co-axially or within a hollow shaft are well known in the art. Generally, an electrically nonconductive driver or rotatable member of the forward control is provided with a rearwardly projecting thrust bearing having an annular runner, and fixedly secured to the driver is a hollow, steel shaft, examples of such construction being disclosed in the patents to Arisman et al., No. Re. 23,750 and Budd et al., No. 2,874,255 issued December 15, 1953, and February 17, 1959, respectively, both patents being as-signed to the same assignee as the present invention. Al-though such construction has been widely accepted by the electronic component industry and is used in millions of controls per year, the construction has left much to be desired. For instance, any severe blow or force ap-plied to the outer end of the hollow, steel shaft tends to loosen or weaken the rigid connection between the hollow, steel shaft and the driver. In addition, when assembling the hollow, steel shaft to the driver, care must be exercised to prevent breakage of the driver. Moreover, since the hollow shaft of a tandem control is generally mounted in a horizontal position, most lubri-cants deposited on the thrust bearing have a tendency especially at elevated temperatures to run down the inner bore of the hollow shaft and toward the outer end there-of, the accumulation of the lubricant on the end of the shaft or the knob attached thereto tending to gather dust as well as interfere with the operation of the control. It would, therefore, be desirable to provide an improved driver and hollow shaft assembly overcoming the above-mentioned limitations.

In tandem control constructions having an inner shaft rotatable within a hollow shaft, it is preferable to provide a bearing adjacent to the ground plate of the rear control for rotatably supporting the inner shaft. Otherwise, the shaft wobbles exessively and it is difficult to alter the resistance of the control. However, by providing the rear control with a bearing adjacent to the ground plate there-of to eliminate wobbling of the shaft, sufficient clear-ance must also be provided between the inner and outer shafts to prevent binding therebetween resulting from slight coaxial misalignment due to manufacturing toler-ances when the controls are assembled together. Such clearance between shafts causes the inner shaft to vibrate and contact the outer shaft, and the longer the shafts, the more critical the problem becomes. For example, in modern automobile radio installations, shafts, relatively long control shafts, as long as five inches are not uncom-mon. In the past, various means have been employed for eliminating the vibration of the inner shaft or at least for dampening the vibrations to the extent that they no longer create an objectionable rattle. One solution to the problem has been to insert a C-shaped washer of a resili-ent material such as nylon into an annular groove pro-vided in the inner shaft. The outer diameter of the C-shaped washer is preferably of a slightly larger diameter than the inner diameter of the hollow shaft to produce a snug fit and eliminate rattling therebetween. An em-bodiment disclosing such construction is shown in Barden Patent No. 2,781,436, issued February 12, 1957. In other embodiments, the noise created by the rattling of the inner shaft has also been somewhat reduced, but not eliminated, by rolling a portion of the hollow, metal shaft to provide a bearing in the bore of the hollow shaft having a diameter less than the remaining bore of the hollow shaft. With existing manufacturing tolerances, however, it is virtually impossible to provide a snug fit between the inner diameter of the rolled metal bearing and the outer diameter of the inner shaft and eliminate rattle. Also with such constructions, as the clearance be-tween the shafts decreases, greater difficulties are incurred during assembly of the controls to prevent mechanical in-terference resulting from slight coaxial misalignment be-tween the front and rear controls, such interference caus-ing an unwanted transfer of motion from one shaft to the other shaft when one of the shafts is rotated. Con-sequently, it would, therefore, be desirable to provide a tandem electrical control with a driver and hollow shaft assembly which will rotatably support the inner shaft, tolerate greater mechanical interference before binding between shafts occurs, and eliminate rattle be-tween the shafts by providing a bearing of nonmetallic material integrally formed with the hollow shaft near the forward end thereof.

Accordingly, it is an object of the present invention to provide a tandem electrical control with a driver and hollow shaft assembly having an integral nonmetallic, forwardly disposed bearing for tolerating greater mechan-ical interference before binding.

Another object of the present invention is to provide a tandem electrical control with a hollow shaft having an integral bearing and a tapered inner bore from the driver of the control to the bearing.

An additional object of the present invention is to pro-vide a tandem electrical control with a cylindrical lubri-cant barrier integrally secured to the driver of the control operable by a hollow shaft.

A further object of the present invention is to pro-vide a tandem electrical control with a driver integrally secured to a hollow shaft intermediate the ends thereof.

Further objects and advantages of the present invention will become apparent as the following description pro-ceeds, and the features of novelty which characterize the invention will be pointed out with particularity in the claims annexed to and forming a part of this specification.

Briefly, the present invention is concerned with a tandem electrical control having a front control operable by a hollow shaft and a rear control operable by an inner shaft or by means disposed within the hollow shaft. In one form of the present invention, a driver is integrally secured to the hollow shaft intermediate the ends thereof. The driver is preferably provided with a rearwardly extending thrust bearing having an annular runner or bearing surface lying in a plane spaced from the end of the shaft to prevent rocking of the driver when the annular runner engages a flat surface. The end of the shaft adjacent to the driver also forms a cylindrical wall or lubricant barrier spaced within the thrust bearing to prevent lubricant applied to the thrust bearing from flowing into the shaft. A nonmetallic bearing is provided in the portion of the hollow shaft and is an integral part thereof for elminating the audible noise or objectionable shaft rattle when the control is subject to vibrations and for tolerating greater mechanical interference of the shafts before binding thereof occurs. The inner bore of the hollow shaft between the driver and the nonmetallic bearing is preferably provided with a taper decreasing in diameter toward the bearing.

For a better understanding of the present invention, reference may be had to the accompanying drawings wherein the same reference numerals have been applied to like parts and wherein.

Figure 1:
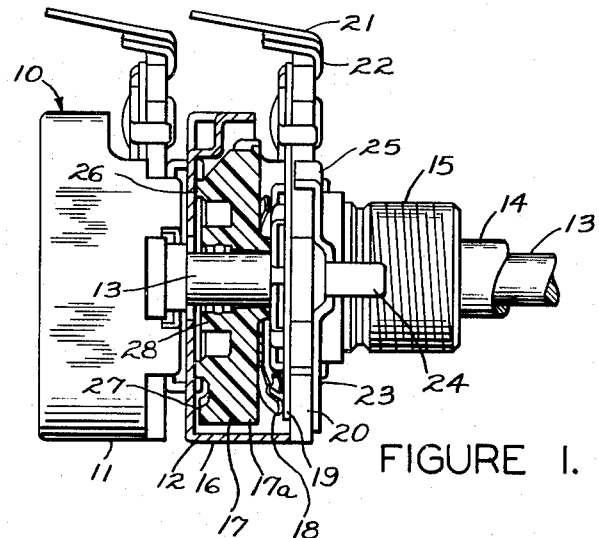
FIGURE 1 is a side elevational view of an improved electrical control built in accord with the present invention, the front cover being sectionalized to show in detail the construction of the control.

Referring now to the drawings, there is illustrated an electrical control of the tandem type employed in automobile radios, complex electronic equipment, and the like, generally indicated at 10, comprising a pair of variable resistors 11 and 12. The variable resistor 11 or rear control is operable by a solid or inner shaft 13, and the variable resistor 12 or front control is operable by a hollow shaft 14 in concentric relationship with the solid shaft 13 and rotatably journalled in a threaded bushing 15. It is to be understood, however, that the inner shaft 13 may be only in coaxial relationship with the hollow shaft 14, adjustment being obtained with an elongated tool, e.g., a screw driver, inserted into the hollow shaft 14 for rotating the inner shaft 13. Also both of the electrical components need not be variable resistors, for example, the rear control may be a switch operable by the inner shaft.

Considering more specifically the variable resistor 12, it comprises a cover 16 enclosing a rotor assembly 17 including a driver 17a carrying a contactor 18. In juxtaposition to the contactor 18 is a resistance element 19 fixedly secured on the inner side of a base or terminal plate 20. The end portion of the hollow shaft 14 projecting inwardly from the terminal plate 20 is fixedly secured to the driver 17a of the rotor assembly 17. In accord with the present invention, the hollow shaft 14 of an electrically nonconductive resilient material such as nylon, Bakelite, polychlorotrifluoroethylene or Delrin is integrally formed with the driver 17a to assure proper concentricity between the driver and the hollow shaft. Although the hollow shaft may be fixedly secured to the driver in a suitable manner to effect the improvements of the present invention, it is preferable to mold the driver 17a and the hollow shaft 14 in one piece. Upon rotation of the hollow shaft 14, the contactor 18 carried by the driver 17a wipes the resistance element 19 intermediate the ends thereof for altering the electrical resistance between the center terminal 21 and the outer terminals 22 of the variable resistor 12. Inasmuch as the contactor 18 is preformed to assure that the resilient fingers thereof engage the resistance element with a light pressure, the driver 17a constrained to rotate with the contactor 18 is biased toward the inner surface of the rear wall of the cover 16.

For the purpose of securing the control to a not shown generally vertically disposed panel, a ground plate 23 is fixedly secured to the threaded bushing 15 and lies flatwise against the front surface of the terminal plate 20. As typical of this type of control, the ground plate 23 is provided with a locating tab 24 receivable in a slot in the panel spaced from the main opening receiving the bushing 15. The cover 16 is secured to the ground plate 23 by ears 25 extending forwardly of the cover 16 and folded over the ground plate 23, the terminal plate 20 being intermediate the ground plate 23 and the cover 16 and, accordingly, fixedly sandwiched therebetween. In essence, the bushing 15 fixedly secured to the cover 16 of the variable resistor 12 rotatably supports the hollow shaft 14 and the hollow shaft 14 supports the inner or solid shaft 13.

Figure 2:
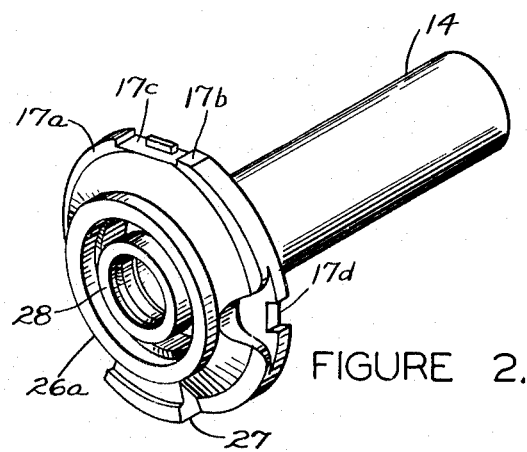
FIGURE 2 is an isometric view of the rotor and shaft assembly shown in FIGURE 1.

As shown in FIGURE 1 of the drawings, the driver 17a is provided with a thrust bearing 26 having a rearwardly extending bearing surface or annular runner 26a lying in a plane normal to the longitudinal axis of the hollow shaft 14 and in contact with the inner face of the rear wall of the cover 16. For the purpose of limiting the angle of rotation of the rotor assembly 17, the driver 17a is provided with a stop member 27 (see FIGURE 2) integrally formed on the rear face of the driver 17a. To assure smooth operation of the control when the driver is rotated, the annular runner 26 of the driver 17a generally is lubricated with oil or grease. As will become apparent from the following description, the driver 17a is secured to the end portion of the hollow shaft 14 with a portion of the shaft extending through the driver 17a, hereinafter such portion of the shaft being referred to as a rearwardly extending cylindrical wall 28. The rearwardly extending cylindrical wall 28 circumposes a portion of the solid shaft 13 and tends to limit flow of any lubricant from the thrust bearing 26 into the bore of the hollow shaft 14. Preferably and as illustrated, the rear face of the cylindrical wall 28 is spaced inwardly from the annular runner 26 to prevent rocking of the driver and to prevent the rear face thereof from functioning as a thrust bearing. As shown in the drawings, an annular groove or passageway encircles the cylindrical wall 28 and retains any lubricant employed for lubricating the thrust bearing 26.

If the driver is molded in a press having attached thereto an automatic degating operation, i.e., an operation for separating the molded parts from the gates, the inner surface of the cylindrical wall 28 is provided with an annular ring 28a receivable in a groove of a not shown molding pin for holding the driver to one of the mold sections during the degating operation. The annular ring may also be provided in the inner surface 26b of the thrust bearing 26 if the end of the hollow shaft 14 does not extend through the driver. For the purpose of preventing the driver and the hollow shaft assembly from rolling when disposed on a table or the like prior to assembly, the driver 17a is provided with a flat portion 17b. In the present embodiment, the gate is secured to the center of the flat portion 17b and, to assure that the junction does not interfere with the operation of the driver, the junction is located in a notch 17c of the driver 17a. Notches 17d are provided in the driver 17a for securing the contactor 18 thereto.

Figure 3:
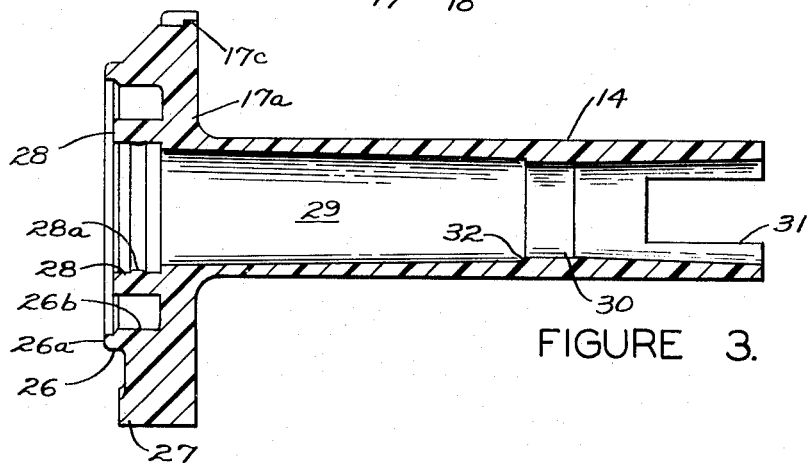
FIGURE 3 is a sectional view of the rotor and shaft assembly of FIGURE 2.

It will be appreciated that tandem electrical controls for certain applications are subjected to stringent temperature requirements. For example, the controls must not freeze and must continue to function properly down to a temperature of −40° C. below zero, e.g., such temperatures occurring in an automobile radio during the winter months. In order to maintain the control operable at such low temperatures, it is usually necessary to lubricate the annular runner 26a of the thrust bearing 26 with a low viscosity lubricant. However, during the summer months, the ambient temperature around an automobile radio causes the low viscosity lubricant to flow more freely away from the annular runner 26a. To assure that any lubricant possibly flowing into the area encompassed by the inner surface 28a of the cylindrical wall 28 does not flow into the central portion of the inner surface of the hollow shaft and toward the front end thereof, the rear portion of the shaft is provided with a tapered bore 29. It is, therefore, an essential feature of the invention that the taper extends away from the driver as shown in FIGURE 3 of the drawings. Thus, any lubricant coming in contact with the inner surface of the hollow shaft will tend to remain near the rear end thereof.

As will become apparent from the following description, means is provided for eliminating the objectionable rattle between the inner shaft 13 and the outer or hollow shaft 14. It will be appreciated that the amplitude of the rattle becomes objectionable usually when the inner shaft 13 and the outer hollow shaft 14 are of a metallic material. Preferably and as illustrated in FIGURE 3 of the drawings, the inner forward end of the hollow shaft 14 is provided with an integral cylindrical bearing 30. By making the bearing of an electrically nonconductive resilient material and fixedly securing the bearing 30 to the hollow shaft 14, objectionable rattle or noise due to rattling of the inner shaft is eliminated. Generally, it is not necessary to lubricate the bearing 30 if it is made of a self lubricating material such as nylon or Delrin. The forward end of the shaft 14 is generally provided with a notch 31 for receiving a spline provided in the central opening of a not shown knob or in the alternative, with a not shown flat for constraining the knob to rotate with the shaft. If the notch 31 is not disposed in the hollow shaft 14, then the bearing 30 is preferably disposed closer to the end of the shaft, i.e., farther away from the driver 17a. A shoulder 32 may be provided in the hollow shaft for separating the taper 29 from the bearing 30. Although the portions extending away from the bearing on either side thereof are tapered as at 29, the bearing is cylindrical and in coaxial relationship with the axis of the hollow shaft.

From the above description, it will be apparent that an improved driver and hollow shaft assembly has been provided in a simple and facile manner for improving the operation of a tandem electrical control.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. In an electrical control having a pair of rotors in tandem and a pair of telescopic inner and outer shafts for effecting adjustment of the rotors, the combination of an electrically nonconductive cylindrical bearing integrally secured in the forward end of the outer shaft for rotatably supporting the inner shaft, the outer shaft being of electrically nonconductive material and integrally connected to one of the rotors, a tapered bore in the outer shaft extending away from the rotor toward the bearing, a thrust bearing having an annular runner projecting rearwardly of the rotor, a cylindrical member spaced within the thrust bearing, and an annular passageway provided between the thrust bearing and the cylindrical member, the rear face of the cylindrical member lying intermediate the annular runner and the cylindrical bearing.

2. In a tandem electrical control having a pair of rotors in tandem and a pair of coaxial shafts for effecting adjustment of the rotors, the combination of a bearing integrally formed in the inner forward portion of the one shaft for rotatably supporting the other shaft, the one shaft being of electrically nonconductive material and integrally connected to one of the rotors, a tapered bore in the one shaft extending away from the rotor toward the bearing, and a thrust bearing extending rearwardly of the rotor and provided with an annular runner normal to the longitudinal axis of the one shaft.

3. An electrical control of the type having a cooperating rotatable element and a stationary element enclosed within a housing, the rotatable element being movable by means of a hollow shaft protruding forwardly from one wall out of the housing, said shaft comprising a nonmetallic bearing integrally secured in the forward portion of the hollow shaft, the end portion of the shaft being fixedly secured to the rotatable element and having a tapered bore increasing from one side of the bearing toward the rotatable element, and a thrust bearing fixedly secured to the rear face of the rotatable element and extending rearwardly thereof, the thrust bearing having a bearing surface lying in a plane normal to the axis of the hollow shaft and extending beyond the rear end portion of the shaft for engaging the inner face of the rear wall of the housing.

4. In a hollow shaft and rotor assembly of electrically nonconductive material for use with a tandem electrical control, the combination of a cylindrical thrust bearing extending rearwardly of the rotor assembly and having a bearing surface lying in a first plane normal to the axis of the hollow shaft, a cylindrical member encircled by the cylindrical thrust bearing and having an outer surface lying in a second plane spaced inwardly from the first plane, and an electrically nonconductive bearing integrally formed in a portion of the inner surface of the hollow shaft.

5. In a rotor assembly for use with a tandem control, the combination of a driver, a hollow shaft integrally secured to the driver, a cylindrical thrust bearing extending rearwardly of the driver and having a bearing surface lying in a first plane normal to the axis of the hollow shaft, an electrically nonconductive bearing forming a portion of the inner surface of the hollow shaft and an integral part thereof, the shaft and the driver being of an electrically nonconductive material, and a tapered bore in the hollow shaft extending from the driver toward the nonconductive bearing.

6. In a rotor assembly for use with a tandem electrical control, the combination of a hollow shaft of electrically nonconductive material, a driver integrally connected to the hollow shaft intermediate the ends thereof, a cylindrical bearing of electrically nonconductive material integrally connected to the inner surface of the hollow shaft at the forward end thereof, and a thrust bearing having an annular runner integrally connected to the driver and extending rearwardly thereof, the annular runner of the thrust bearing lying in a plane spaced rearwardly from the end of the hollow shaft.

7. In a rotor assembly for use with a tandem electrical control, the combination of a hollow shaft of electrically nonconductive material, a driver integrally connected to the hollow shaft intermediate the ends thereof, a cylindrical bearing of electrically nonconductive material integrally connected to the inner surface of the hollow shaft, a tapered bore in the hollow shaft extending from the driver to the cylindrical bearing, and a thrust bearing integrally connected to the driver and extending rearwardly thereof, the bearing surface of the thrust bearing lying in a plane spaced rearwardly from the end of the hollow shaft, the end of the shaft and the thrust bearing forming an annular passageway therebetween.

8. An electrical control of the type having a rotatable element enclosed within a housing, the rotatable element being movable by means of a hollow shaft protruding forwardly from one wall out of the housing, said shaft comprising a nonmetallic bearing integrally secured in the forward portion of the hollow shaft, the end portion of the shaft being fixedly secured to the rotatable element and having a tapered bore increasing from one side of the bearing toward the rotatable element, and a thrust bearing fixedly secured to the rear face of the rotatable element and extending rearwardly of the rotatable element.

9. In a rotor assembly for use with a tandem electrical control having a housing, the combination of a hollow shaft of electrically nonconductive material, a driver integrally connected to the hollow shaft, an electrically nonconductive bearing integral with the shaft and forming a portion of the inner surface of the hollow shaft, and bearing means integral with the driver and abutting against a portion of the housing rotatably supporting the driver.

10. The rotor assembly of claim 9 wherein the hollow shaft is provided with a tapered bore extending from the nonconductive bearing to one end of the shaft.

References Cited by the Examiner

UNITED STATES PATENTS

| Re. 23,750 | 12/1953 | Arisman et al. | 338—131 |
| 2,536,181 | 1/1951 | Hultgren | 64—1 |
| 2,585,844 | 2/1952 | Romero | 64—1 |
| 2,781,436 | 2/1957 | Barden | 64—1 X |
| 2,884,771 | 5/1959 | Holt | 64—4 |

BROUGHTON G. DURHAM, *Primary Examiner.*

HALL C. COE, *Assistant Examiner.*